May 16, 1939.  W. C. TROUT  2,158,161

CENTER IRON BEARING

Filed April 20, 1934  2 Sheets-Sheet 1

Inventor
W. C. TROUT.
Jesse R. Stone
Lester B. Clark
By
Attorneys

May 16, 1939.  W. C. TROUT  2,158,161
CENTER IRON BEARING
Filed April 20, 1934  2 Sheets-Sheet 2
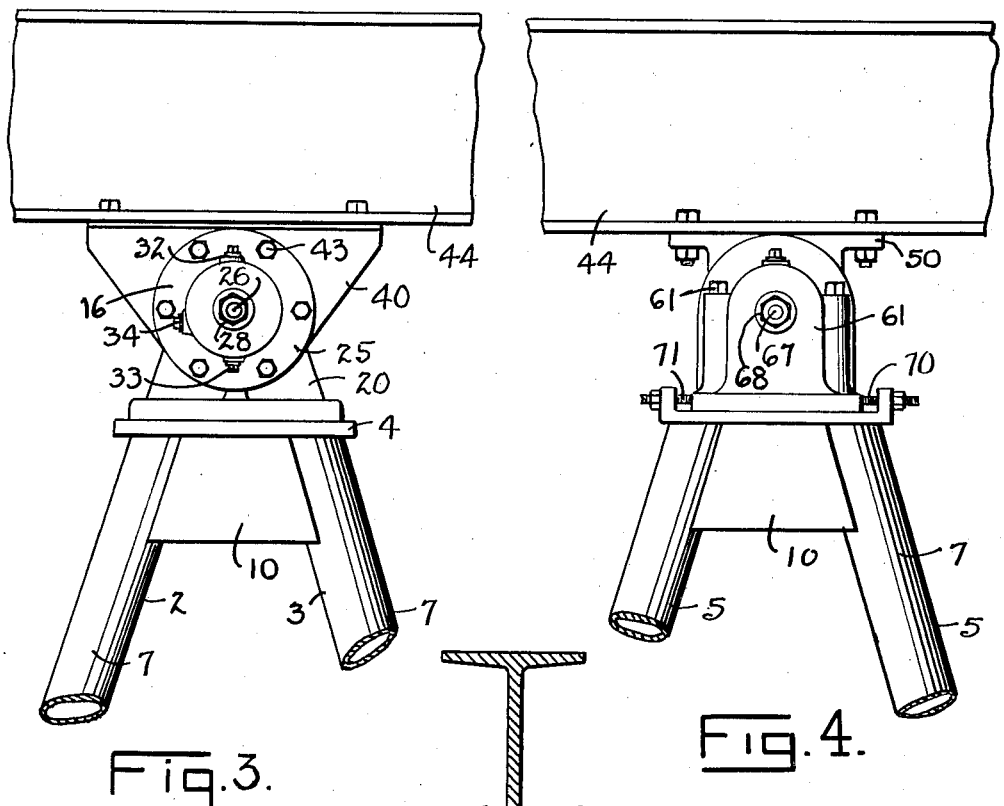
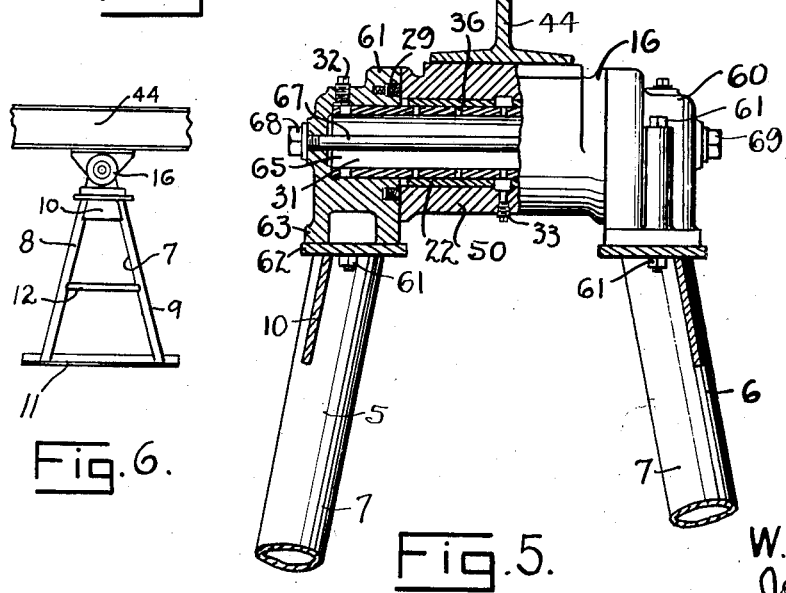
Inventor
W. C. TROUT.
Jesse R. Stone
Lester B. Clark
By
Attorneys Patented May 16, 1939

2,158,161

UNITED STATES PATENT OFFICE 2,158,161

CENTER IRON BEARING

Walter C. Trout, Lufkin, Tex., assignor to Lufkin Foundry & Machine Company, Lufkin, Tex., a corporation Application April 20, 1934, Serial No. 721,526

3 Claims. (Cl. 308—103)

The invention relates to an improvement in center iron bearings of the type generally employed on the jackpost or Samson post on well drilling and pumping equipment.

A great many center iron bearings have been devised heretofore to support the walking beam or pumping beam in such a manner that it may perform its rocking movement, but a majority of these have been so constructed that the bearing surfaces were inadequate and lubrication was difficult. With the present invention it is broadly contemplated that the bearing surfaces will be materially increased, and lubrication made possible.

It is another object of the invention to provide a center iron bearing wherein a large bearing surface is available to support the load.

Another object of the invention is to provide a center iron bearing with a lubricant chamber so that constant lubrication is assured.

Another object of the invention is to provide a center iron bearing which is made up of a through-shaft and a cap member at each end thereof assembled to support the load.

Another object of the invention is to provide a center iron bearing which will serve as a brace for a built-up supporting post.

Still another object of the invention is to provide a center iron bearing which serves as the top of the supporting post.

Still another object of the invention is to provide a center iron bearing having a through bolt therein which serves to clamp the parts together as a means of connecting the upper end of the supporting structure.

It is also an object of the invention to provide a supporting post and bearing cap therefor of such construction that the bearing serves to clamp the two sides of the post together.

Other and further objects of the invention will be readily apparent when the following description is considered in connection with the accompanying drawings wherein:

Fig. 3 is an end elevation of the bearing shown in Figs. 1 and 2.

Fig. 4 is an end elevation of a modified form of the bearing.

Fig. 5 is a side view of the bearing in Fig. 4, showing the parts in section and illustrating the manner of using the bearing as a clamp or brace across the top of the supporting post.

Fig. 6 is a diagrammatic view of a side elevation of the supporting post.

As is well understood in oil field equipment, it is usual to provide a supporting post for the walking beam or pumping jack so that a rocking movement may be performed in carrying on the pumping or drilling operation. In the drilling operation the supporting post is known as a Samson post while in the pumping operation it is known as a jack post. For the purposes of this invention it will be designated as a supporting post with the intention to apply the invention to either a Samson or a jack post.

It is contemplated that two types of post may be used with the present invention, however, but each of these types of posts may be used as either a Samson post or a jack post as desired.

Figure 2:
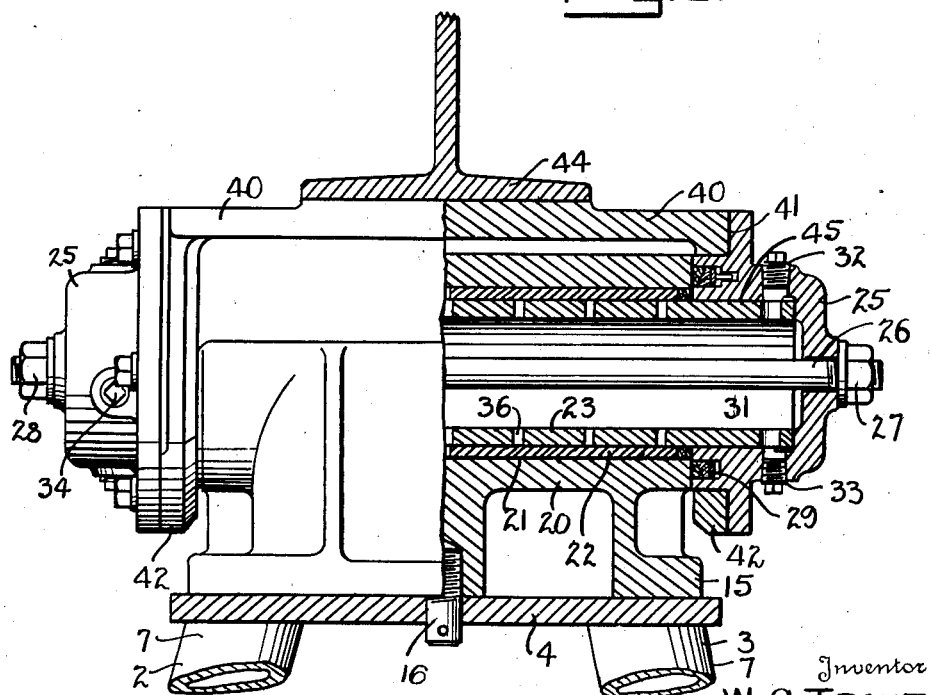
Fig. 2 is a side elevation of the bearing of Fig. 1 showing the parts in section.

Figs. 2 and 3 show an edge and side view, respectively, of the upper end of one form of post, while Figs. 4 and 5 show a side view and edge view, respectively, of a slightly modified form of post. The side members of each of the posts are alike but in Figs. 2 and 3 the left side 2 and the right side 3 are connected together at the top by a plate 4, whereas in the form of post shown in Figs. 4 and 5 there is no such connecting plate, but the sides 5 and 6, respectively, are connected together by means of the bearing itself. By having reference to Fig. 6 it will be seen that the side of the post takes the configuration of an A frame, such as 7, and is made up of the legs 8 and 9 which converge upwardly and are connected at their upper ends by the brace plate 10. The lower ends of the legs 8 and 9 are connected by a base or thrust member 11 which serves to rigidly fix the lower ends of the legs. If desired an intermediate brace 12 may be used to connect the leg members. The construction thus far is identical regardless of whether the side or A frame 7 is to be incorporated in the Fig. 3 type of post or the Fig. 4 type of post.

In the type of post used in Figs. 2 and 3 the left-hand frame 7 and the right-hand frame 7 are connected at their upper ends by means of the cap plate 4 which is preferably rigidly secured to the upper ends of the frame to make up the completed post.

In Figs. 2 and 3 the bearing member 15 is shown as being anchored on the connecting plate 4 by means of the hold-down bolt 16. It is usual to adjust the bearing in this type of construction so that the walking beam may be turned at an angle with respect to its normal path of reciprocation. To permit this the slot 17 is provided so that the bearing may be turned with respect to the post. A suitable clamping bolt is provided to hold the bearing in position, such bolt being old and well known and not being here illustrated.

In the form of post shown in Figs. 4 and 5, however, the connecting plate 4 has been dispensed with and the bearing 16 serves as the cap or brace plate to connect the side frames together. This is particularly useful in connection with jackpost constructions because in many instances the pumping jack is constructed to have an underslung arrangement for oscillation between the two side frames.

Figure 1:
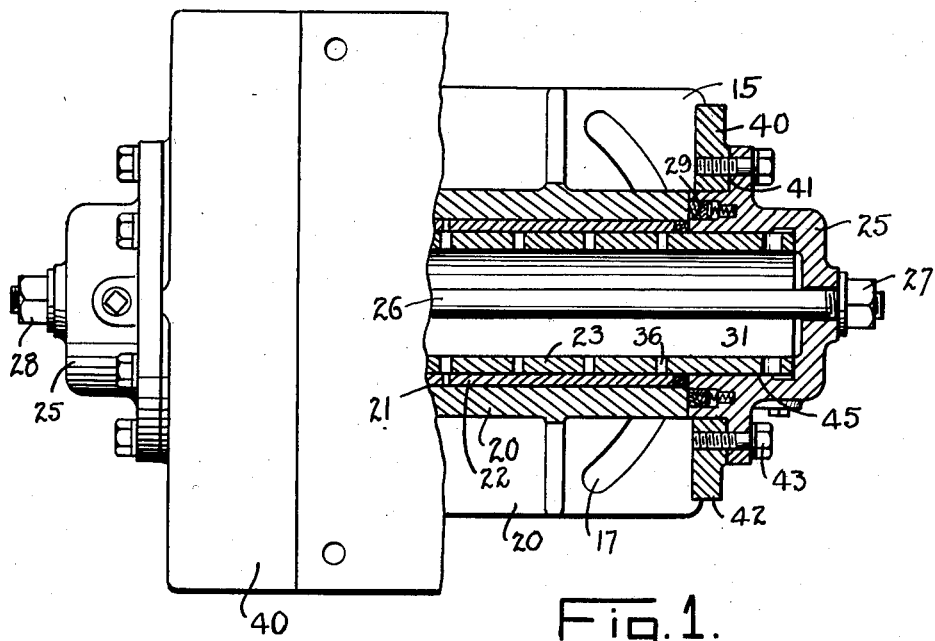
Fig. 1 is a top plan view of one form of the invention partly broken away and showing the bearing in section.

The bearing of Figs. 1 and 2 is of such construction as to support enormous loads and to provide a bearing which may be readily lubricated and will distribute the load over a large area. With this in mind, the bearing is constructed with a body portion 20 which is adapted to rest upon the connecting plate 4. This body 20 has a central transverse opening 21 therethrough which is adapted to receive the bushing 22. This bushing in turn receives the bearing shaft 23 which is of considerably greater length than the length of the opening through the body 20. A cap 25 is mounted on each end of the bearing shaft 23 and is arranged to abut against the end of the body 20.

In order to hold the caps 25 in position, a through-bolt 26 is arranged to pass through the bearing shaft and through each of the caps 25. A suitable nut 27 on one end and nut 28 on the other end of the through-bolt permit an assembly of the parts in such a manner that the caps can be securely clamped upon the bearing shaft. The abutting faces of the body 20 and the caps 25 are arranged to form a seal because of the packing 29 carried by one of the faces. It is intended that the bearing shaft 23 will be hollow to form a lubricant chamber 31 whereby a supply of lubricant is present at all times so that proper lubrication of the parts may be had. An opening 32 is provided in the top of the cap 25 and a similar opening 33 is provided in the base thereof, whereas an inspection opening 34 is provided in the side of the cap.

It will be particularly noted that the bearing shaft 23 has a plurality of openings 36 therein to allow the lubricant in the chamber 31 to flow into the bearing area between the bearing shaft and the bushing 22.

In order that the walking beam or other load may be supported on the bearing, the bearing frame or walking beam saddle 40 is arranged to engage both of the caps 25. As seen in Fig. 2, the cap is formed with a reduced area 41 which receives the end ring 42 which is part of the bearing frame 40. It is intended that the nuts 27 and 28 on the through-bolt 26 will be tightened to such an extent that the caps 25 will be clamped to the bearing frame 40 so that they will move together as an integral unit. The walking beam 44 may be fixed to the top of the bearing frame in any suitable manner.

Fig. 1 shows the bolts 43 passing through the cap and the bearing frame ring 42 to secure the two parts together in addition to the clamping action of the bolt 26.

From the construction it will be apparent that the load of the walking beam 44 is transmitted to the caps 25 so that the entire area of the shaft within the caps is available to absorb the load. This area is indicated at 45. The load applied to the bearing shaft 23 in this manner is distributed over the entire area of the bushing 22 which is in contact with the bearing shaft throughout its area and throughout the width of the body 20. In this manner there are large bearing areas which are well lubricated so that the bearing may be set up and operated for great periods of time without any attention whatsoever. As will be understood, the bearing shaft 23 may be a full floating shaft so that it may rotate in either the bushing 22 or the caps 25, or both. If desired, the nuts 27 and 28 may be drawn up so tightly that the shaft will be clamped in the caps 25 and caused to rotate with them. This is the preferred form of the invention and for this reason the bushing 22 is provided to permit the greatest area between the moving parts.

In Figs. 4 and 5 a slightly modified form of the invention is provided, the general arrangement, however, being somewhat the same as in Figs. 1 and 2.

In Fig. 5 the body 20 has been modified to some extent so that the lower portion thereof which rested upon the connecting plate 4 has been eliminated. In Fig. 5 the body is indicated at 50 and carries the bushing 22, the same as in Fig. 2. The walking beam 44, however, is fixed to the body 50 the same as it is fixed to the bearing frame 40 in Fig. 2. The support of the bearing is accomplished by fixing the caps 60 and 61 directly on the upper ends of the frames 7. The bolts 61' accomplish this purpose. The upper end of each of the frames 7 is provided with a support plate 62 through which the bolts 61' project to hold the bearing caps 60 and 61 in position. The bearing caps 60 and 61 are substantially the same as the caps 25 except that they are provided with an extended foot 63 to rest upon the plate 62. They carry the packing 29 and the oil openings 32, the same as in the previous form of the invention. The drain opening 33 has been transferred from the cap to the bearing body, however.

The bearing shaft is substantially the same as in the previous form and is indicated at 65, being clamped in position by the through bolt 67 and the nuts 68 and 69.

In this last form of the invention the through bolt 65 serves the double function of not only clamping the bearing shaft in position and holding the bearing together, but also serves to clamp the two side A frames together in order to obtain a rigid construction. As previously described, the end caps 60 and 61 are fixed to the frame so that when the through-bolt 67 is positioned a rigid structure is obtained. The bearing shaft 65 takes the transverse thrust so that the caps 60 and 61 may not bind against the ends of the bearing body 50. The packing 29 is provided to prevent the escape of the lubricant which is carried in the chamber 31.

This last form of the invention is as previously pointed out, of advantage with pumping jacks, because the framework may be underslung and there will be no transverse brace to interfere with its operation.

If desired the bearing may be mounted for lateral adjustment by means of the adjusting screws 70 and 71 shown in Fig. 4. This type of construction is well known and is provided to adjust the position of the walking beam so that the end thereof may be positioned directly over the opening in the well so that a vertical movement of the device may be obtained.

While two forms of the bearing and post have been shown and described, it is contemplated that the device may be made up with either form of bearing or either form of post, as the circumstances may warrant.

What is claimed is:

1. A center iron bearing including a walking beam saddle, a pair of cap members thereon, a bearing shaft adapted to fit into said cap members to carry the load on said saddle, a through-bolt extending through said shaft and caps to clamp them together, and means encircling said shaft bearing and abutting said caps to support the load.

2. A center iron bearing for pumping and drilling rigs including a walking beam saddle, spaced rings at each side thereof, a bearing cap fitted into each ring, a packing on the inner end of each cap, a shaft fitting into each bearing cap, a bolt through said shaft and caps to clamp them together, a support body encircling said shaft between said caps and adapted to abut the packings therein, bearing bushing in said body and about said shaft, a packing at each end of said bushing, and lubricant passages through said shaft to said bushing whereby a supply of lubricant may be sealed in said shaft and flow to said bushing.

3. A center iron bearing for walking beams including a stationary support body, a bushing therein, a hollow bearing shaft disposed in said bushing and projecting beyond each end of said body and said bushing, a bearing frame straddling said body and to which the load is applied, said frame including bearing rings about the projecting ends of said shaft to transmit the load from said frame to said shaft, means to close the ends of said shaft to confine a body of lubricant therein, and additional means at the ends of said bushing to also confine such lubricant.

WALTER C. TROUT.